United States Patent
Konttori et al.

(10) Patent No.: US 10,602,033 B2
(45) Date of Patent: Mar. 24, 2020

(54) DISPLAY APPARATUS AND METHOD USING IMAGE RENDERERS AND OPTICAL COMBINERS

(71) Applicant: Varjo Technologies Oy, Helsinki (FI)

(72) Inventors: Urho Konttori, Helsinki (FI); Oiva Arvo Oskari Sahlsten, Salo (FI); Kseniia Duginova, St. Petersburg (RU)

(73) Assignee: VARJO TECHNOLOGIES OY, Helsinki (FI)

( * ) Notice: Subject to any disclaimer, the term of this patent is extended or adjusted under 35 U.S.C. 154(b) by 193 days.

(21) Appl. No.: 15/584,497

(22) Filed: May 2, 2017

(65) Prior Publication Data
US 2018/0324332 A1  Nov. 8, 2018

(51) Int. Cl.
*G02B 27/14* (2006.01)
*H04N 5/217* (2011.01)
(Continued)

(52) U.S. Cl.
CPC ......... *H04N 5/2171* (2013.01); *G02B 3/0037* (2013.01); *G02B 6/3504* (2013.01);
(Continued)

(58) Field of Classification Search
CPC ............ G02B 27/0172; G02B 27/0101; G02B 27/0178; G02B 27/017; G02B 27/0149; G02B 27/0123; G02B 27/0176; G02B 3/0037; G02B 6/3504; G02B 27/01; G02B 2027/0187; G02B 2027/0118;
(Continued)

(56) References Cited

U.S. PATENT DOCUMENTS 6,804,066 B1 * 10/2004 Ha ................... G02B 5/1814
                                                        359/683
9,711,072 B1 *  7/2017 Konttori ............ G03B 21/142
(Continued)

FOREIGN PATENT DOCUMENTS

| CA | 2249976 C | 11/1999 | |
|----|-----------|---------|---|
| EP | 0618471 A2 | 10/1994 | |
| EP | 0618471 B1 * | 2/2004 | .......... G02B 27/017 |

OTHER PUBLICATIONS

International Search Report and Written Opinion received for International Application No. PCT/FI2018/050299, dated Nov. 20, 2018, 22 pages.

*Primary Examiner* — William R Alexander
*Assistant Examiner* — Tamara Y. Washington
(74) *Attorney, Agent, or Firm* — Ziegler IP Law Group, LLC (57) ABSTRACT

A display apparatus, and a method of displaying via the display apparatus. The display apparatus includes at least one context image renderer for rendering a context image, at least one focus image renderer for rendering a focus image, at least one first optical combiner for combining the projection of the rendered context image with the projection of the rendered focus image to form a combined projection, and at least one second optical combiner for combining the combined projection with a projection of a real world image. An angular width of a projection of the rendered context image ranges from 40 degrees to 220 degrees. An angular width of a projection of the rendered focus image ranges from 5 degrees to 60 degrees.

9 Claims, 5 Drawing Sheets

(51) Int. Cl.
*H04N 13/383* (2018.01)
*H04N 13/156* (2018.01)
*G02B 3/00* (2006.01)
*G02B 6/35* (2006.01)
*G02B 27/01* (2006.01)
*G06T 5/00* (2006.01)
*G06T 15/50* (2011.01)
*H04N 5/232* (2006.01)
*G06T 7/73* (2017.01)
*H04N 13/344* (2018.01)
*G02B 5/20* (2006.01)

(52) U.S. Cl.
CPC .......... *G02B 27/0172* (2013.01); *G06T 5/003* (2013.01); *G06T 15/503* (2013.01); *H04N 5/23212* (2013.01); *H04N 13/156* (2018.05); *H04N 13/383* (2018.05); *G02B 5/20* (2013.01); *G02B 2027/013* (2013.01); *G02B 2027/014* (2013.01); *G02B 2027/0123* (2013.01); *G02B 2027/0138* (2013.01); *G02B 2027/0147* (2013.01); *G02B 2027/0161* (2013.01); *G02B 2027/0174* (2013.01); *G02B 2027/0178* (2013.01); *G02B 2027/0187* (2013.01); *G06T 7/73* (2017.01); *H04N 13/344* (2018.05)

(58) Field of Classification Search
CPC ...... G02B 2027/0127; G02B 2027/014; G02B 2027/015; G02B 2027/0123; G02B 2027/013; G02B 2027/0138; G02B 2027/0147; G02B 2027/0161; G02B 2027/0174; G02B 2027/0178; G02B 2027/011; G02B 5/20; G06T 5/003; G06T 15/503; G06T 7/73; H04N 9/3129; H04N 13/144; H04N 13/344; H04N 13/183; H04N 13/346; H04N 13/363; H04N 5/7491; H04N 5/2171; H04N 13/383; H04N 13/156; H04N 5/23212
USPC ...................................................... 359/630
See application file for complete search history.

(56) References Cited

U.S. PATENT DOCUMENTS

| | | | |
|---|---|---|---|
| 9,711,114 B1* | 7/2017 | Konttori | G06F 3/013 |
| 9,905,143 B1* | 2/2018 | Konttori | G02B 7/04 |
| 9,983,413 B1* | 5/2018 | Sahlsten | G02B 26/0816 |
| 9,989,774 B1* | 6/2018 | Sahlsten | G02B 27/0176 |
| 10,052,765 B2* | 8/2018 | Kamoi | B25J 9/1697 |
| 10,168,537 B1* | 1/2019 | Parsons | G02B 27/0172 |
| 10,236,986 B1* | 3/2019 | Shatz | H04B 10/116 |
| 10,371,998 B2* | 8/2019 | Sahlsten | G02B 27/0172 |
| 2005/0140573 A1* | 6/2005 | Riser | G02B 27/0172 345/7 |
| 2006/0176242 A1* | 8/2006 | Jaramaz | A61B 5/0059 345/7 |
| 2015/0212326 A1 | 7/2015 | Kress et al. | |
| 2015/0260992 A1* | 9/2015 | Luttmann | G02B 27/0172 359/631 |
| 2017/0010451 A1* | 1/2017 | Naya | G02B 5/04 |
| 2017/0235144 A1* | 8/2017 | Piskunov | G02B 27/0081 359/13 |
| 2017/0293144 A1* | 10/2017 | Cakmakci | G02B 27/01 |
| 2017/0343818 A1* | 11/2017 | Espie | G02B 27/0172 |
| 2018/0324332 A1* | 11/2018 | Konttori | G02B 3/0037 |
| 2019/0041641 A1* | 2/2019 | Christmas | G02B 27/01 |
| 2019/0041797 A1* | 2/2019 | Christmas | G02B 5/0205 |

* cited by examiner

DISPLAY APPARATUS AND METHOD USING IMAGE RENDERERS AND OPTICAL COMBINERS

TECHNICAL FIELD

The present disclosure relates generally to augmented reality; and more specifically, to display apparatuses comprising context image renderers, focus image renderers and optical combiners. Furthermore, the present disclosure also relates to methods of displaying, via the aforementioned display apparatuses.

BACKGROUND

Nowadays, with advancements in technologies such as virtual reality, augmented reality and so forth, users of specialized devices are able to experience digitally simulated environments (namely, virtual worlds). Specifically, such simulated environments enhance a user's perception of reality around him/her by providing the user with a feeling of complete involvement in the simulated environments using contemporary techniques such as stereoscopy. Moreover, such simulated environments relate to fully virtual environments (namely, virtual reality) as well as real-world environments including virtual objects therein (namely, augmented reality).

Typically, the user may utilize specialized devices, such as an augmented reality device, for experiencing such simulated environments. For example, the augmented reality device may be a binocular augmented reality device (for example, such as augmented reality glasses) having one display per eye, and cameras to capture a real-world environment of a user. In other words, the displays of the binocular augmented reality device show different two-dimensional images of virtual objects to the left and right eyes of the user for making the virtual objects appear realistic from a perspective of the user. Examples of such augmented reality devices include near-eye displays such as augmented reality headsets, augmented reality lenses, and so forth.

However, conventional augmented reality devices have certain limitations. For example, the size of displays suitable for closely imitating visual acuity of the human eyes is too large to be accommodated within the conventionally available augmented reality devices that aim to be moderately small. Specifically, displays with field of view comparable to the human eyes are dimensionally very large, and therefore, not suitable for use in such augmented reality devices.

Moreover, presently available augmented reality devices are unable to achieve optimum trade-off between the field of view and angular resolution, thereby, compromising on either the field of view, or on the angular resolution. Furthermore, the presently available augmented reality devices, namely see-through augmented reality devices, are operable to render the simulated environments in a limited field of view and/or a limited angular resolution. Consequently, the presently available augmented reality devices are limited in their capability to render realistic and/or highly detailed virtual objects in a large field of view.

Furthermore, conventional augmented reality devices are unable to resolve vergence-accommodation conflict, thereby causing strain in the eyes of the user. The cause is typically two-fold: 1. Inability to cover convergence of eye needed to focus at close-by objects (as displays are too small to cover enough horizontal field of view to cater for both focus at long and short distance) and 2. Inability to change optical focus distance to reflect the actual real world distance. Therefore, the conventional augmented reality devices are limited in their ability to mimic the human visual system.

Therefore, in light of the foregoing discussion, there exists a need to overcome the aforementioned drawbacks associated with conventional augmented reality devices.

SUMMARY

The present disclosure seeks to provide a display apparatus.

The present disclosure also seeks to provide a method of displaying, via a display apparatus comprising at least one context image renderer, at least one focus image renderer, at least one first optical combiner, and at least one second optical combiner.

The present disclosure seeks to provide a solution to the existing problem of physical size limitations, vergence-accommodation conflict, angular resolution and image discontinuities within conventional augmented reality devices. A further aim of the present disclosure is to provide a solution that overcomes at least partially the problems encountered in the prior art, and that provides a robust, easy to use display apparatus to closely mimic the human visual system.

In one aspect, an embodiment of the present disclosure provides a display apparatus comprising:
  at least one context image renderer for rendering a context image, wherein an angular width of a projection of the rendered context image ranges from 40 degrees to 220 degrees;
  at least one focus image renderer for rendering a focus image, wherein an angular width of a projection of the rendered focus image ranges from 5 degrees to 60 degrees;
  at least one first optical combiner for combining the projection of the rendered context image with the projection of the rendered focus image to form a combined projection; and
  at least one second optical combiner for combining the combined projection with a projection of a real world image.

In another aspect, an embodiment of the present disclosure provides a method of displaying, via a display apparatus comprising at least one context image renderer, at least one focus image renderer, at least one first optical combiner and at least one second optical combiner, the method comprising:
(i) rendering a context image at the at least one context image renderer, wherein an angular width of a projection of the rendered context image ranges from 40 degrees to 220 degrees;
(ii) rendering a focus image at the at least one focus image renderer, wherein an angular width of a projection of the rendered focus image ranges from 5 degrees to 60 degrees; and
(iii) using the at least one first optical combiner to combine the projection of the rendered context image with the projection of the rendered focus image to form a combined projection; and
(iv) using the at least one second optical combiner to combine the combined projection with a projection of a real world image.

Embodiments of the present disclosure substantially eliminate or at least partially address the aforementioned problems in the prior art, and enable implementation of augmented reality using the described display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
at least one context image renderer for rendering a context image, wherein an angular width of a projection of the rendered context image ranges from 40 degrees to 220 degrees;
at least one focus image renderer for rendering a focus image, wherein an angular width of a projection of the rendered focus image ranges from 5 degrees to 60 degrees;
at least one first optical combiner for combining the projection of the rendered context image with the projection of the rendered focus image to form a combined projection; and
at least one second optical combiner for combining the combined projection with a projection of a real world image.

In another aspect, an embodiment of the present disclosure provides a method of displaying, via a display apparatus comprising at least one context image renderer, at least one focus image renderer, at least one first optical combiner and at least one second optical combiner, the method comprising:
(i) rendering a context image at the at least one context image renderer, wherein an angular width of a projection of the rendered context image ranges from 40 degrees to 220 degrees;
(ii) rendering a focus image at the at least one focus image renderer, wherein an angular width of a projection of the rendered focus image ranges from 5 degrees to 60 degrees; and
(iii) using the at least one first optical combiner to combine the projection of the rendered context image with the projection of the rendered focus image to form a combined projection; and
(iv) using the at least one second optical combiner to combine the combined projection with a projection of a real world image.

Embodiments of the present disclosure provide the display apparatus and the method of displaying via the display apparatus. Beneficially, the display apparatus described herein is not limited in operation by the size of the focus and context renderers. Therefore, the display apparatus may be easily implemented in small-sized devices such as augmented reality devices. Furthermore, the described display apparatus may be operable to simulate active foveation of the human visual system and takes into account saccades and microsaccades of the human eye. Therefore, the described display apparatus may closely imitate gaze contingency paradigm. Moreover, the combined projection using the described display apparatus appears continuous even at edges of the rendered context and focus images. Beneficially, the display apparatus reduces strain in the eyes of users by having high enough resolution to create pleasant image to the eyes and by having ability to vary the focus distance of part, or whole image, thus reducing eye-strain.

In one embodiment, the combined projection is combined with the projection of the real world image to create a visual scene of a simulated environment (for example, such as an augmented reality environment) to be presented to a user of a device, for example, such as augmented reality glasses, augment reality lenses, and so forth. Therefore, the visual scene may be projected onto eyes of the user of the device. In such an embodiment, the device comprises the display apparatus described herein, and the display apparatus is said to operate in a 'mixed-reality mode'.

In another embodiment, the combined projection is combined with the projection of the real world image such that only the projection of the real world is projected onto the eyes of the user, while the combined projection is suppressed from being similarly projected. In such an embodiment, the device comprises the display apparatus, and the display apparatus is said to operate in a 'see-through mode'.

In an embodiment, the real world image relates to an image depicting actual surroundings of the user whereat he/she is positioned.

Throughout the present disclosure, the term "angular width" refers to an angular width of a given projection as seen from a user's eyes, when the display apparatus is worn by the user.

Optionally, the angular width of the projection of the rendered context image is greater than 220 degrees. According to an embodiment, the angular width of the projection of the rendered context image may be for example from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees. According to another embodiment, the angular width of the projection of the rendered focus image may be for example from 5, 10, 15, 20, 25, 30, 35, 40, 45 or 50 degrees up to 15, 20, 25, 30, 35, 40, 45, 50, 55 or 60 degrees.

In an embodiment, the context image relates to a wide image of a virtual scene to be rendered and projected via the display apparatus. Specifically, the aforementioned angular width of the context image accommodates saccades associated with movement of the eyes of the user, when the user views the virtual scene. Optionally, the virtual scene comprises at least one virtual object to be overlaid on the projection of the real world image. Examples of the at least one virtual object include, but are not limited to, virtual navigation tools (for example, such as virtual maps, virtual direction signage, and so forth), virtual gadgets (for example, such as virtual calculator, virtual computer, and so forth), virtual messages (for example, such as virtual instant messages, virtual chat conversations, virtual to-do notes), virtual entities (for example, such as virtual people, virtual animals, and so forth), virtual entertainment media (for example, such as virtual videos, virtual interactive advertisements, and so forth), and virtual information (for example, such as virtual news, virtual announcements, virtual data, and so forth).

In another embodiment, the focus image relates to another image depicting a part (namely, a portion) of the virtual scene, to be rendered and projected via the display apparatus. Specifically, the aforementioned angular width of the focus image accommodates microsaccades associated with the movement of the eyes of the user, when the user views the visual scene. More specifically, the focus image is dimensionally smaller the context image.

It is to be understood that the context and focus images collectively constitute the virtual scene upon combination of projections thereof by the at least one first optical combiner, to form the combined projection. Specifically, an image of the virtual scene collectively constituted by the context and focus images is referred to hereinafter as 'virtual reality image'. Therefore, the combined projection is representative of the virtual reality image. Moreover, the visual scene of the simulated environment, created by combining the combined projection with the projection of the real world image, includes the at least one virtual object overlaid on the actual surroundings of the user.

In an embodiment, the term 'context image renderer' used herein relates to equipment configured to facilitate rendering of the context image. Optionally, the at least one context image renderer is implemented by way of at least one context display configured to emit the projection of the context image thereon. In another embodiment, the term 'focus image renderer' used herein relates to equipment configured to facilitate rendering of the focus image. Optionally, the at least one focus image renderer is implemented by way of at least one focus display configured to emit the projection of the focus image thereon. According to an embodiment, the context image renderer and/or the focus image renderer are selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Digital Light Processing® (DLP)-based display.

Optionally, the at least one context image renderer and/or the at least one focus image renderer are implemented by way of at least one projector and at least one projection screen. Optionally, the at least one projection screen is curved in shape. Hereinafter, the at least one projector used to implement the at least one context image renderer is referred to as the 'at least one context image projector', for the sake of convenience and clarity. Similarly, the at least one projector used to implement the at least one focus image renderer is referred to as the 'at least one focus image projector'.

Optionally, the at least one projection screen is a display or a surface configured to facilitate rendering of the context image and/or the focus image thereon. It will be appreciated that the curved shape of the at least one projection screen facilitates reduction in geometric and chromatic aberrations within the display apparatus. Moreover, the at least one projection screen is configured for rendering the context image and/or the focus image by diffuse reflection and/or specular reflection.

In one embodiment, the at least one projection screen associated with the at least one context image projector and/or the at least one focus image projector is the same (namely, is shared therebetween). Optionally, in such a case, both the at least one context image projector and the at least one focus image projector render the context image and the focus image respectively, at the shared projection screen.

Optionally, the at least one projection screen is flat (namely, planar) in shape. More optionally, the at least one projection screen is freeform in shape. Optionally, in this regard, the freeform shape is implemented as a combination of flat and curved surfaces including protrusions and depressions on a surface of the at least one projection screen.

In an embodiment, the at least one projector used to implement the at least one context image renderer and/or the at least one focus image renderer is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing® (DLP)-based projector, and a laser projector.

According to an embodiment, the at least one context image renderer and/or the at least one focus image renderer are movable for adjusting the projections of the rendered context and focus images in a desired manner. Optionally, the at least one context image renderer and/or the at least one focus image renderer are moved (for example, by actuators) to adjust the position of the rendered context image and/or the rendered focus image with respect to each other. More specifically, such movement may include at least one of displacement (horizontally and/or vertically), rotation, tilting and so forth, of the at least one context image renderer and/or the at least one focus image renderer. Beneficially, such movement of the at least one context image renderer and/or the at least one focus image renderer is utilized in the event of a change in a gaze direction of the user.

In an embodiment, the at least one context image renderer is used to render separate context images for the left and right eyes of the user. It will be appreciated that the separate context images collectively constitute the context image. According to an embodiment, the at least one context image renderer comprises at least two context image renderers, at least one of the at least two context image renderers being arranged to be used for a left eye of a user, and at least one of the at least two context image renderers being arranged to be used for a right eye of the user. Optionally, the at least two context image renderers are used in a manner that at least one context image renderer may be dedicatedly (namely, wholly) used to render the context image for one of the left or right eye of the user. Beneficially, the at least two context image renderers allow separate optimization of optical paths of the separate context images (for example, a context image for the left eye of the user and a context image for the right eye of the user) constituting the context image.

Similarly, in another embodiment, the at least one focus image renderer is used to render separate focus images for the left and right eyes of the user. It will be appreciated that the separate focus images collectively constitute the focus image. According to an embodiment, the at least one focus image renderer comprises at least two focus image renderers, at least one of the at least two focus image renderers being arranged to be used for a left eye of a user, and at least one of the at least two focus image renderers being arranged to be used for a right eye of the user.

Throughout the present disclosure, the term 'first optical combiner' used herein generally refers to equipment (for example, such as optical elements, displays, and so forth) for optically combining the projections of the rendered context and focus images to constitute the combined projection of the virtual scene. Optionally, the at least one first optical combiner is configured to simulate active foveation of a human visual system. More optionally, the combined projection is dynamically repositionable and/or refocusable.

For example, a first optical combiner may be a shared projection screen associated with both of the at least one context image projector and the at least one focus image projector. Optionally, the shared projection screen has suitable optical characteristics to facilitate its use as the first optical combiner. Optionally, in such a case, optical paths of the projections of the rendered context and focus images is simplified, thereby, optimizing an arrangement of the display apparatus.

In one embodiment, the at least one first optical combiner is implemented by way of at least one of: a semi-transparent mirror, a semi-transparent film, a prism, a polarizer, a lens, an optical waveguide. For example, the semi-transparent mirror for implementing the at least one first optical combiner may be a pellicle mirror. In another example, two prisms may be used for implementing the at least one first optical combiner. Optionally, in such a case, an overlap of the two prisms with each other is controlled using actuators.

According to an embodiment, the at least one first optical combiner is curved in shape. It will be appreciated that the curve of the at least one first optical combiner can be in any suitable direction and shape, for example, such as an outside-in hemisphere, an inside-out hemisphere, a parabolic shape, and so forth. Beneficially, the curved shape of the at least one first optical combiner facilitates a reduction in the size of the display apparatus. Furthermore, the curved shape of the at least one first optical combiner enables a reduction in geometric and chromatic aberrations occurring within the display apparatus.

According to another embodiment, the at least one first optical combiner is flat (namely, planar) in shape. More optionally, the at least one first optical combiner is freeform in shape. Optionally, in this regard, the freeform shape is implemented as a combination of flat and curved surfaces including protrusions and depressions on a surface of the at least one first optical combiner.

In one embodiment, when the freeform-shaped at least one first optical combiner is employed in the display apparatus, the display apparatus further comprises additional optical elements, for example such as lenses, prisms, and so forth, which are to be placed between the at least one context image renderer and the at least one first optical combiner, on an optical path of the projection of the rendered context image. Optionally, such additional optical elements are used to suitably compensate for aberrations caused in the display apparatus by use of the freeform-shaped at least one first optical combiner.

In another embodiment, if the freeform-shaped at least one first optical combiner is employed in the display apparatus, the at least one context image renderer implemented by way of the at least one context display is curved in shape.

In an embodiment, the at least one first optical combiner comprises at least one optical element that is arranged for any of:
(i) allowing the projection of the rendered context image to pass through substantially, whilst reflecting the projection of the rendered focus image substantially;
(ii) allowing the projection of the rendered focus image to pass through substantially, whilst reflecting the projection of the rendered context image substantially;
(iii) allowing the projections of the rendered context image and the rendered focus image to pass through substantially, reflecting the projections of the rendered context image and the rendered focus image substantially.

Optionally, the at least one optical element is arranged to combine the optical paths of the projections of the rendered context and focus images to facilitate formation of the combined projection. It is to be understood that such an arrangement of the at least one optical element facilitates the projection of the rendered focus image to fall on and around the fovea of the eye, while the projection of the rendered context image is projected on a retina of the eye, of which the fovea is just a small part. In an embodiment, the at least one optical element of the at least one first optical combiner is implemented by way of at least one of: a semi-transparent mirror, a semi-transparent film, a prism, a polarizer, a lens, an optical waveguide.

According to an embodiment, the at least one optical element of the at least one first optical combiner is positioned at, at least one of: an optical path of the projection of the rendered context image, an optical path of the projection of the rendered focus image, an optical path of the combined projection. In one example, a lens (for example, such as a convex lens, a plano-convex lens, a Liquid Crystal (LC) lens, a liquid lens, and so forth) may be positioned on the optical path of the combined projection. In another example, a magnifying optical element (for example, such as a convex lens) may be positioned at the optical path of the rendered context image, between the at least one context image renderer and the at least one first optical combiner. In such a case, when the at least one context image renderer is implemented by way of the at least one context display, the use of the magnifying optical element allows for use of dimensionally small context display(s). Beneficially, the magnifying optical element potentially enables a magnification (namely, an enlargement) in the size of the projection of the rendered context image.

Therefore, it is to be understood that the physical size (namely, dimensions) of the at least one context image renderer and/or the at least one focus image renderer does not limit the operation of the display apparatus as described herein.

In an embodiment, the at least one first optical combiner comprises at least one actuator for moving at least one of: the at least one focus image renderer, the at least one context image renderer, the at least one optical element of the at least one first optical combiner. Optionally, the at least one actuator is controlled to adjust a location of the projection of the rendered context image and/or a location of the projection of the rendered focus image on the at least one first optical combiner. Moreover, optionally, such a movement includes at least one of: displacement (horizontally and/or vertically), rotation, and/or tilting. In an example, the at least one focus image renderer may be moved by one actuator to accommodate for diopter tuning, astigmatism correction, and so forth.

Throughout the present disclosure, the term 'second optical combiner' used herein generally refers to equipment (for example, such as optical elements, displays, and so forth) for combining the combined projection with the projection of the real world image to constitute a resultant projection of the visual scene of the simulated environment. Optionally, the resultant projection of the visual scene of the simulated environment includes the at least one virtual object overlaid on the actual surroundings of the user. Beneficially, the resultant projection is projected onto the eyes of the user. Therefore, the at least one second optical combiner is arranged for directing (for example, by reflecting, by transmitting therethrough, or a combination thereof) the resultant projection substantially towards a direction of the eyes of the user.

It will be appreciated that use of a same second optical combiner on optical paths of the combined projection and the projection of the real world image is beneficial for enhancing realism in the visual scene of the simulated environment when the display apparatus operates in the 'mixed-reality mode'. Such a benefit in the quality of the rendered simulated environment is attributed to a precision in an optical alignment between the combined projection and the projection of the real world image through the same second optical combiner. Moreover, in such an instance, disparities in viewing the rendered simulated environment due to the movement of the eyes of the user are minimal.

In an embodiment, the at least one second optical combiner is implemented by way of at least one of: a semi-transparent mirror, a prism, a polarizer, an optical waveguide. For example, the at least one second optical combiner may be implemented as an optical waveguide. In such a case, the optical waveguide may be arranged to allow the combined projection to pass towards a field of vision of the eyes of the user by reflection therefrom. Moreover, in such a case, the optical waveguide may be transparent such that the projection of the real world image is visible therethrough. Optionally, for this purpose, the optical waveguide is semi-transparent. Alternatively, optionally, the optical waveguide is arranged to allow the projection of the real world image to pass towards the field of view of the eyes of the user by reflection therefrom, and the optical waveguide is transparent such that the combined projection is visible therethrough. In another example, the at least one second optical combiner may be implemented as a polarizer for polarizing the projection of the real world image for stronger transparency thereof.

According to an embodiment, the at least one second optical combiner is switchable to different levels of transparency. Optionally, the transparency of the at least one second optical combiner is controlled electrically to combine the combined projection with the projection of the real world image, as desired by the user. In an example, the at least one second optical combiner may be semi-transparent (for example, 30 percent, 40 percent, 50 percent, 60 percent, or 70 percent transparent) to combine the combined projection with the projection of the real world image for projection onto the eyes of the user, such as in the 'mixed-reality mode'. In another example, the at least one second optical combiner may be highly transparent (for example, 80 percent, 90 percent, or 100 percent transparent) such that only the projection of the real world image is projected onto the eyes of the user, such as in the 'see-through mode'. In such a case, the combined projection constituting the representation of the virtual reality image is suppressed from being projected onto the eyes of the user. In yet another example, the at least one second optical combiner may be highly opaque (for example, 0 percent, 10 percent or 20 percent transparent) such that only the combined projection, constituting the projections of the rendered focus and context images of the virtual scene, is projected onto the eyes of the user. In such a case, the projection of the real world image may be suppressed from being projected onto the eyes of the user.

According to an embodiment, the at least one second optical combiner is curved in shape. It will be appreciated that the curve of the at least one second optical combiner can be in any suitable direction and shape, for example such as an outside-in hemisphere, an inside-out hemisphere, a parabolic shape, and so forth. Beneficially, the curved shape of the at least one second optical combiner potentially increase the field of view of the display apparatus and facilitate a reduction in the size of the display apparatus. Furthermore, the curved shape of the at least one second optical combiner enables a reduction in geometric and chromatic aberrations occurring within the display apparatus.

According to another embodiment, the at least one second optical combiner is flat (namely, planar) in shape. More optionally, the at least one second optical combiner is freeform in shape. Optionally, in this regard, the freeform shape is implemented as a combination of flat and curved surfaces including protrusions and depressions on a surface of the at least one second optical combiner. It will be appreciated that such a freeform-shaped second optical combiner has dual benefit over a flat (namely, planar) second optical combiner. Firstly, a wider field of view is potentially achieved by employing a dimensionally smaller freeform-shaped second optical combiner, as compared to a flat second optical combiner. Secondly, the freeform-shaped second optical combiner potentially serves as a lens subsystem for controlling an optical path of the combined projection.

Optionally, the at least one second optical combiner is moved by at least one actuator associated therewith for adjusting the resultant projection of the visual scene of the simulated environment, to be projected onto the eyes of the user. Optionally, the at least one actuator associated with the at least one second optical combiner is controlled automatically to move the at least one second optical combiner. In an example, the actuator may move the at least one second optical combiner closer or away from the eyes of the user. In another example, the actuator may move the at least one second optical combiner vertically up and down with respect to the eyes of the user. In yet another example, the actuator may tilt and/or rotate the at least one second optical element with respect to the eyes of the user.

In an embodiment, the at least one second optical combiner has a first surface facing the real world and a second surface substantially opposite to the first surface, wherein the first surface is substantially reflective, while the second surface is substantially anti-reflective. The first surface, being substantially reflective, allows light emanating from the real world to be reflected substantially towards at least one imaging device, such as a camera. Optionally, such a reflective first surface enhances the quality of the real world image captured by the at least one imaging device. The second surface, being substantially anti-reflective, reduces unwanted reflection of the combined projection towards the eyes of the user, thereby, preventing ghosting (namely, double image) of the virtual reality image. Additionally, the anti-reflective second surface prevents ghosting of the real world image captured by the at least one imaging device, and facilitates transmission of the projection of the real world image through the at least one second optical combiner towards the eyes of the user.

In this way, only the substantially-reflective first surface is employed to reflect the combined projection towards the eyes of the user and to reflect the real world image towards the at least one imaging device, whilst the substantially anti-reflective second coating is employed to prevent ghosting within the display apparatus.

Moreover, optionally, the at least one second optical combiner includes a first coating to implement the substantially-reflective first surface, and a second coating to implement the substantially anti-reflective second surface. As an example, the first coating may be a metallic coating (for example, titanium coating, silver coating, gold coating, and so forth) having a higher refractive index as compared to that of its underlying substrate (namely, the first surface). Moreover, the second coating may be a traditional multilayer anti-reflective coating.

Furthermore, optionally, the display apparatus further comprises a varifocal element for adjusting a focus of the projection of the rendered focus image. Specifically, the varifocal element adjusts an optical distance of at least one object in the rendered focus image with respect to at least one real world object in the real world image. The at least one object in the rendered focus image is the at least one virtual object of the virtual scene, to be overlaid on the projection of the real world image. Beneficially, the varifocal element adjusts the optical distance of the at least one object in the rendered focus image, with regard to the eyes of the user, to be substantially equivalent to a real world distance between the real world object and the eyes of the user.

In an embodiment, the varifocal element is positioned on an optical path between the at least one focus image renderer and the at least one first optical combiner. More optionally, the varifocal element is positioned on the optical path of the projection of the rendered focus image. In another embodiment, the varifocal element is positioned on an optical path between the at least one first optical combiner and the at least one second optical combiner. Specifically, the varifocal element may be positioned on the optical path of the combined projection.

It will be appreciated that the varifocal element alleviates vergence-accommodation conflict by utilizing a stereopsis technique to adjust the focus of the projection of the rendered focus image. Therefore, fatigue of ciliary muscles of the eyes of the user is significantly reduced upon use of the varifocal element in the display apparatus. Consequently, strain in the eyes of the user is reduced.

In an embodiment, the display apparatus further comprises at least one third optical combiner for combining the projection of the rendered context image with the projection of the rendered focus image to form a preliminary combined projection. Optionally, the at least one third optical combiner is positioned on an optical path between the aforesaid image renderers (namely, the at least one context image render and the at least one focus image render) and the at least one first optical combiner. More optionally, the at least one third optical combiner is arranged to project the preliminary combined projection onto the at least one first optical combiner. In such an instance, optionally, the at least one first optical combiner is configured to adjust optical characteristics (for example, such as brightness, contrast, angular width, and the like) of the preliminary combined projection to form the aforementioned combined projection. Optionally, the at least one third optical combiner is selected from the group consisting of a lens, a prism, a beam splitter, and an optical waveguide.

Moreover, optionally, the at least one third optical combiner is movable for adjusting a location of the preliminary combined projection on the at least one first optical combiner in a desired manner. Optionally, in this regard, the at least one third optical combiner is moved using one or more actuators. More optionally, such movement includes at least one of: displacement of the at least one third optical combiner (horizontally and/or vertically), rotation of the at least one third optical combiner, and/or tilting of the at least one third optical combiner.

Moreover, optionally, the display apparatus further comprises means for detecting a gaze direction and a processor coupled in communication with the at least one first optical combiner, the at least one second optical combiner and the means for detecting the gaze direction.

In an embodiment, the processor is implemented by way of hardware, software, firmware or a combination of these, suitable for controlling the operation of the display apparatus. Optionally, the processor is configured to control the operation of the display apparatus to process and display (namely, project) the visual scene of the simulated environment onto the eyes of the user. In an instance wherein the display apparatus is used within the device associated with the user, the processor may or may not be external to the device.

Optionally, the processor is communicably coupled to a memory unit. In an embodiment, the memory unit is implemented by way of hardware, software, firmware, or a combination of these, suitable for storing images to be processed by the processor.

In an embodiment, the means for detecting a gaze direction relates to specialized equipment for measuring a direction of gaze of the eye and movement of the eye, for example such as eye trackers. An accurate detection of the gaze direction potentially allows the display apparatus to closely implement gaze contingency thereon. Moreover, the means for detecting the gaze direction may or may not be placed in contact with the eye. Examples of the means for detecting a gaze direction include, but are not limited to, contact lenses with sensors, cameras monitoring position of pupil of the eye, and so forth.

According to an embodiment, the processor is configured to obtain an input image, and use the detected gaze direction to determine a region of visual accuracy of the input image. It will be appreciated that the term "input image" used herein generally refers to an image (for example, such as an image depicting the visual scene of a simulated environment) to be displayed via the display apparatus. In an embodiment, the input image is a combination of the real world image and the virtual reality image. For example, the input image may be an image depicting a visual scene of a coffee shop environment whereat the user is positioned, such that the visual scene includes three virtual menus of food and drinks available for purchase at the coffee shop. In such a case, the real world image may depict the coffee shop environment, while the virtual reality image may depict the three virtual menus of food and drinks. In another embodiment, the input image is received from the memory unit communicably coupled to the processor. Optionally, the memory unit is configured to store the input image in a suitable format, for example such as Moving Pictures Experts Group (MPEG), Joint Photographic Experts Group (JPEG), Tagged Image File Format (TIFF), Portable Network Graphics (PNG), Graphics Interchange Format (GIF), Bitmap file format (BMP) and the like.

In an embodiment, the processor is configured to use the detected gaze direction to determine a region of visual accuracy of the input image. It will be appreciated that the term "region of visual accuracy" generally refers to a region of the input image whereat the detected gaze direction of the eye may be focused. Optionally, the region of visual accuracy is a region of interest (namely, a fixation point) within the input image, and is projected onto the fovea of the eye. Referring to the aforementioned example, the region of visual accuracy in the input image depicting the coffee shop environment may be at one of the three virtual menus of food and drinks. Moreover, the region of visual accuracy may be the region of focus within the input image. Therefore, it will be appreciated that the region of visual accuracy relates to a region resolved to a much greater detail as compared to other regions of the input image, when the input image is viewed by the human visual system.

Optionally, after determining the region of visual accuracy of the input image, the processor is configured to process the input image to generate the context image and the focus image, wherein the context image has a first resolution and the focus image has a second resolution. Optionally, the second resolution is higher than the first resolution. Moreover, optionally, the focus image substantially corresponds to the region of visual accuracy of the input image, while the context image corresponds to a low-resolution representation of the input image. Therefore, the context image includes the region of visual accuracy of the input image along with remaining region of the input image. More optionally, the size of the context image is larger than the size of the focus image, as the focus image corresponds to only a portion of the context image whereat the detected gaze direction of the eyes of the user is focused.

It will be appreciated that the first and second resolutions can be understood in terms of angular resolution. Optionally, pixels per degree indicative of the second resolution are higher than pixels per degree indicative of the first resolution. In an example, the fovea of the eye of the user corresponds to 2 degrees of the field of view, and receives a projection of the focus image of an angular cross section width equal to 114 pixels indicative of 57 pixels per degree resolution. Therefore, an angular pixel size corresponding to the focus image would be equal to 2/114 or 0.017. Moreover, in such a case, the retina of the eye corresponds to 180 degrees of the field of view, and receives a projection of the context image of an angular cross section width equal to 2700 pixels indicative of 15 pixels per degree resolution. Therefore, an angular pixel size corresponding to the context image would be equal to 180/2700 or 0.067. As calculated, the angular pixel size corresponding to the context image is clearly much larger than the angular pixel size corresponding to the focus image. However, a perceived angular resolution indicated by a total number of pixels may be greater for the context image as compared to the focus image, as the focus image corresponds to only a part of the context image that corresponds to the region of visual accuracy of the input image.

Optionally, a region of the context image that substantially corresponds to the region of visual accuracy of the input image is masked. Optionally, the processor is configured to perform such masking in order to hide (namely, obscure) the region of the context image corresponding to the region of visual accuracy of the input image. For example, pixels of the context image corresponding to the region of visual accuracy of the input image may be dimmed for masking.

Optionally, after processing the input image, the processor is configured to render the context image at the at least one context image renderer and the focus image at the at least one focus image renderer substantially simultaneously, whilst controlling the at least one first optical combiner to combine the projection of the rendered context image with the projection of the rendered focus image in a manner that the projection of the rendered focus image substantially overlaps the projection of the masked region of the rendered context image. The combined projection represents the virtual reality image. It will be appreciated that the context and focus images are rendered substantially simultaneously in order to avoid any time lag during combination of the projections thereof.

The angular width of the projection of the rendered context image is larger than the angular width of the projection of the rendered focus image. This may be attributed to the fact that the rendered focus image is typically projected on and around the fovea of the eye, whereas the rendered context image is projected on a retina of the eye, of which the fovea is just a small part. Specifically, a combination of the rendered context and focus images (namely, the combined projection) constitutes the virtual reality image and is projected onto the eye to project the at least one virtual object thereon.

In an embodiment, rendering the context image, rendering the focus image, and controlling the at least one first optical combiner to form the combined projection, are performed substantially simultaneously.

In an embodiment, the at least one first optical combiner substantially overlaps the projection of the rendered focus image with the projection of the masked region of the rendered context image to avoid distortion of the region of visual accuracy of the input image. Optionally, the region of visual accuracy of the input image is represented within both the rendered context image of low resolution and the rendered focus image of high resolution. The combination (namely, superimposition) of projections of low and high-resolution images of a same region may result in a distortion of appearance of the same region in the combined projection. Moreover, the rendered focus image having a high resolution may include more information pertaining to the region of visual accuracy of the input image, as compared to the rendered context image having a low resolution. Therefore, the region of the context image that substantially corresponds to the region of visual accuracy of the input image is masked, in order to project the rendered high-resolution focus image without any distortion.

Furthermore, according to an embodiment, the processor is configured to mask the region of the context image corresponding to the region of visual accuracy of the input image such that transitional area seams (namely, edges) between the region of visual accuracy of the input image and the remaining region of the input image are reduced, for example minimized. It will be appreciated that the region of visual accuracy of the displayed input image corresponds to the projection of the focus image (and the masked region of the context image), whereas the remaining region of the displayed input image corresponds to the projection of the context image. Optionally, the masking is performed as a gradual gradation in order to reduce, for example to minimize, the transitional area seams between the superimposed context and focus images so that the combined projection appears continuous. For example, the processor may significantly dim pixels of the context image corresponding to the region of visual accuracy of the input image, and gradually reduce the amount of dimming of the pixels with an increase in a distance thereof from the region of visual accuracy of the input image.

Optionally, masking the region of the context image that substantially corresponds to the region of visual accuracy of the input image is performed using linear transparency mask blend of inverse values between the context image and the focus image at the transition area, stealth (namely, camouflage) patterns containing shapes naturally difficult for detection by the eyes of the user, and so forth. If an alignment of the projections of the rendered context and focus images is improper, namely has discontinuities, then the combined projection, and consequently, the resultant projection of the visual scene of the simulated environment would also appear improper.

In an embodiment, the processor is configured to implement image processing functions for at least one of the at least one context image renderer and/or the at least one focus image renderer. Optionally, the image processing functions are implemented prior to rendering the context and the focus images. More optionally, the implementation of such image processing functions optimizes the quality of the rendered context and focus images. Therefore, the image processing functions are selected by taking into account properties of at least one of the at least one context image renderer and/or the at least one focus image renderer, and the properties of the input image.

According to an embodiment, image processing functions for the at least one context image renderer comprise at least one function for optimizing perceived context image quality, wherein the at least one function is selected from the group consisting of low pass filtering, colour processing, and gamma correction. In an embodiment, the image processing functions for the at least one context image renderer further comprise edge processing to reduce, for example to minimize, perceived distortion on a boundary of the combined projection.

According to an embodiment, image processing functions for the at least one focus image renderer comprise at least one function for optimizing perceived focus image quality, wherein the at least one function is selected from the group consisting of image cropping, image sharpening, colour processing, and gamma correction. In an embodiment, the image processing functions for the at least one focus image renderer further comprise edge processing to reduce, for example to minimize, perceived distortion on a boundary of combined projection.

Furthermore, in an embodiment, the display apparatus also comprises at least one camera coupled in communication with the processor, wherein the at least one camera is positioned in a proximity of the first surface of the at least one second optical combiner facing the real world. Optionally, the at least one camera is arranged for capturing the projection of the real world image reflected towards the at least one camera from the first surface. Optionally, when the at least one camera is positioned in the proximity of the first surface, an optical location of an image sensor of the at least one camera is close to (namely, comparable with) an optical location of the eyes of the user. Therefore, an image of the real world captured by the at least one camera highly corresponds to a view of the real world, as seen by the eyes of the user. In this embodiment, the first surface of the at least one second optical combiner is substantially reflective.

Moreover, optionally, the at least one camera is implemented by way of a two-dimensional camera or a three-dimensional camera. Examples of such two-dimensional cameras include, but are not limited to, digital cameras and analog cameras. Examples of such three-dimensional cameras include, but are not limited to, range cameras (for example, such as Light Detection and Ranging (LiDAR) camera, laser rangefinders, and so forth) and stereo cameras.

Optionally, the at least one camera is embedded within the device to enable the user of the device to see the real world through the device. Such pass-through arrangement by embedding the at least one camera within the device potentially enhances the user's viewing experience using the display apparatus, since such arrangement does not restrict the field of view of the eyes of the user.

According to an embodiment, the processor is operable to combine the at least one image of the real world with the combined projection to reduce vergence-accommodation conflict. Optionally, the processor performs such a combination to determine overlaying of the at least object (in the virtual scene represented by the combined projection) over the projection of the real world image in a manner that reduces vergence-accommodation conflict, whilst operating the display apparatus. Moreover, as the image of the real world captured by the at least one camera highly corresponds to the view of the real world as seen by the eyes of the user, it serves as a frame of reference for determining the overlaying of the at least one object to operate the display apparatus in the 'mixed-reality mode'.

In an embodiment, the display apparatus comprises at least one optical element that is positioned at an optical path of the projection of the real world image and/or an optical path of the resultant projection obtained by combining the combined projection with the projection of the real world image. Optionally, the at least one optical element is implemented by way of at least one of: a semi-transparent mirror, a semi-transparent film, a prism, a polarizer, a lens, an optical waveguide.

DETAILED DESCRIPTION OF THE DRAWINGS

Figure 1:
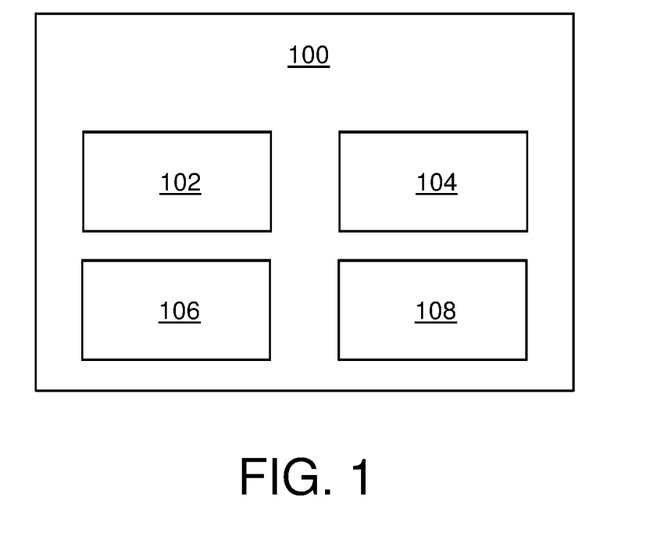
FIGS. 1 and 2 are block diagrams of architectures of a display apparatus, in accordance with embodiments of the present disclosure.

Referring to FIG. 1, there is illustrated a block diagram of an architecture of a display apparatus 100, in accordance with an embodiment of the present disclosure. The display apparatus 100 includes at least one context image renderer (depicted as a context image renderer 102) for rendering a context image, at least one focus image renderer (depicted as a focus image renderer 104) for rendering a focus image, at least one first optical combiner (depicted as a first optical combiner 106) for combining a projection of the rendered context image with a projection of the rendered focus image to form a combined projection, and at least one second optical combiner (depicted as a second optical combiner 108) for combining the combined projection with a projection of a real world image.

Figure 2:
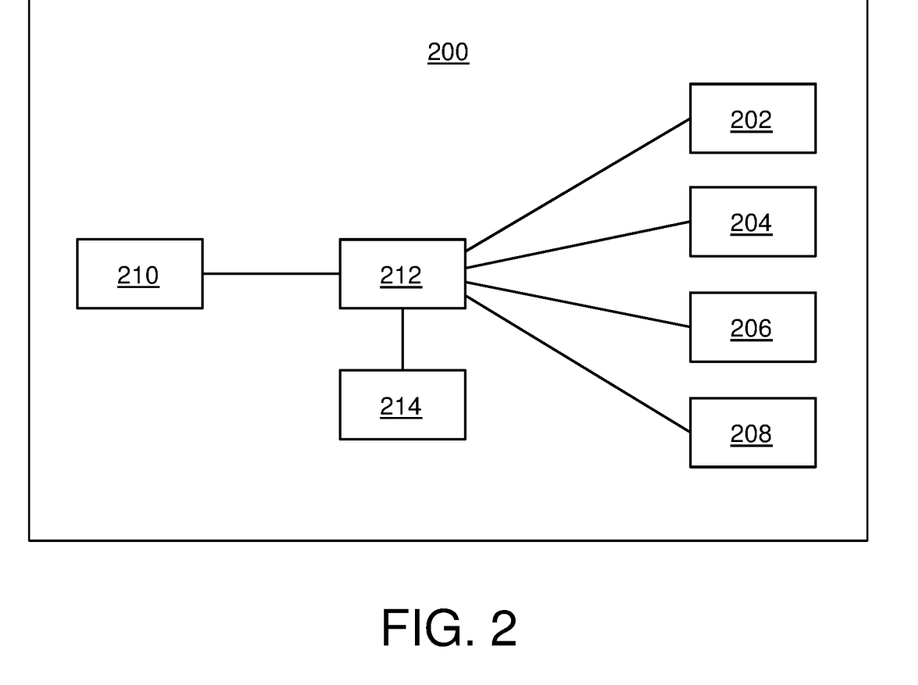

Referring to FIG. 2, there is illustrated a block diagram of an architecture of a display apparatus 200, in accordance with another embodiment of the present disclosure. The display apparatus 200 includes at least one context image renderer (depicted as a context image renderer 202) for rendering a context image, at least one focus image renderer (depicted as a focus image renderer 204) for rendering a focus image, at least one first optical combiner (depicted as a first optical combiner 206) for combining a projection of the rendered context image with a projection of the rendered focus image to form a combined projection, at least one second optical combiner (depicted as a second optical combiner 208) for combining the combined projection with a projection of a real world image, means for detecting a gaze direction 210, a processor 212, and at least one camera (depicted as a camera 214) for capturing at least one image of the real world. As shown, the processor 212 is coupled to the context image renderer 202, the focus image renderer 204, the first optical combiner 206, the second optical combiner 208, the means for detecting a gaze direction 210 and the camera 214.

Referring to FIGS. 3 to 7, there are illustrated exemplary implementations of the display apparatus 100 (as shown in FIG. 1), in accordance with various embodiments of the present disclosure. It is to be understood by a person skilled in the art that the FIGS. 3-7 include simplified arrangements for implementing the display apparatus 100 for the sake of clarity, which should not unduly limit the scope of the claims herein. The person skilled in the art will recognize many variations, alternatives, and modifications of embodiments of the present disclosure.

Figure 3:
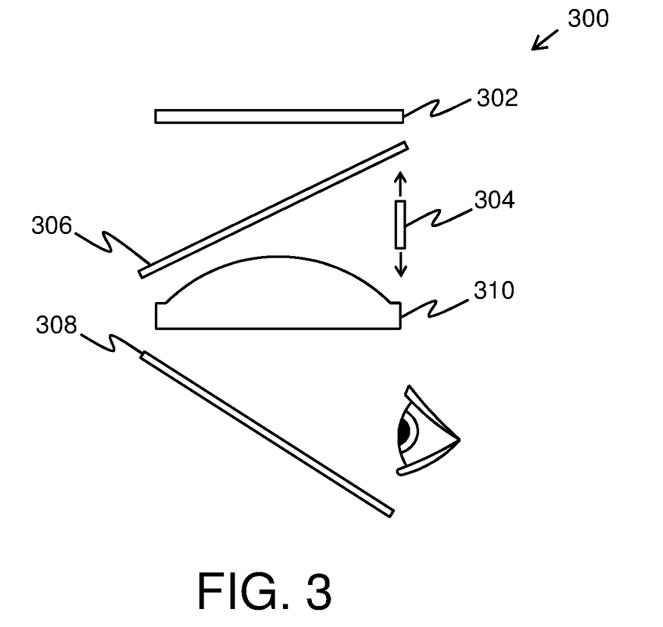
FIGS. 3 to 7 are exemplary implementations of the display apparatus, in accordance with various embodiments of the present disclosure.

Referring to FIG. 3, there is illustrated an exemplary implementation of a display apparatus 300, in accordance with an embodiment of the present disclosure. As shown, the display apparatus 300 includes at least one context image renderer (depicted as a context image renderer 302) for rendering a context image, at least one focus image renderer (depicted as a focus image renderer 304) for rendering a focus image, at least one first optical combiner (depicted as a first optical combiner 306), at least one second optical combiner (depicted as a second optical combiner 308), and a lens 310 positioned on an optical path of projections of the rendered context and focus images (more specifically, on an optical path of the combined projection). As shown, the second optical combiner 308 is flat (namely, planar) in shape. In an example, the context image renderer 302 may be a context display, the focus image renderer 304 may be a focus display, and the first optical combiner 306 may be a semi-transparent mirror, for example, such as a pellicle mirror. The lens 310 depicts an optical element of the first optical combiner 306.

Figure 4:
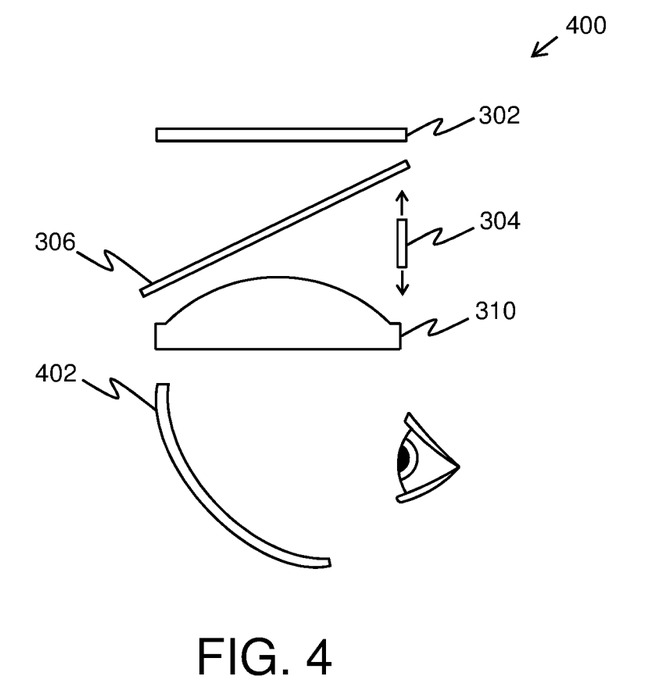

Referring to FIG. 4, there is illustrated an exemplary implementation of a display apparatus 400 (such as the display apparatus 300 of FIG. 3), in accordance with another embodiment of the present disclosure. As shown, the display apparatus 400 includes the context image renderer 302 for rendering the context image, the focus image renderer 304 for rendering the focus image, the first optical combiner 306, a second optical combiner 402, and the lens 310 positioned on the optical path of projections of the rendered context and focus images. As shown, the second optical combiner 402 is curved in shape. It will be appreciated that the curved shape of the second optical combiner 402 of the display apparatus 400 is in contrast with the flat second optical combiner 308 of the display apparatus 300 of FIG. 3.

Figure 5:
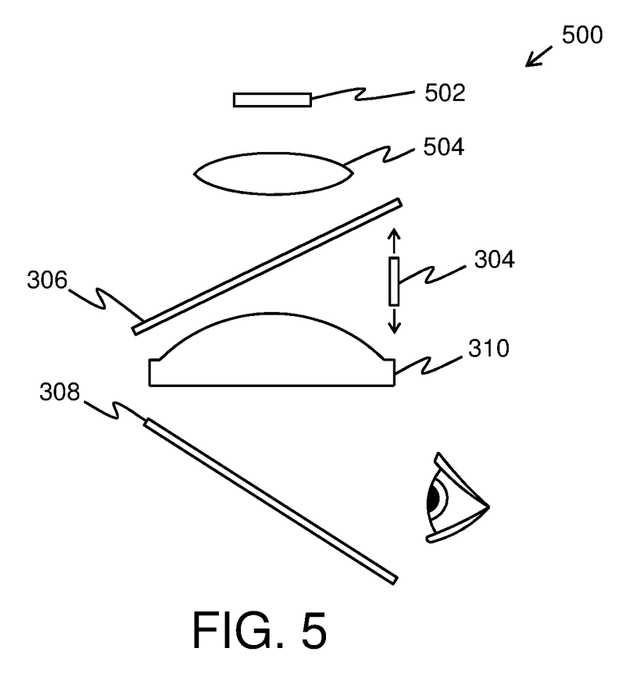

Referring to FIG. 5, there is illustrated an exemplary implementation of a display apparatus 500 (such as the display apparatus 300 of FIG. 3), in accordance with yet another embodiment of the present disclosure. As shown, the display apparatus 500 includes a context image renderer 502 for rendering the context image, the focus image renderer 304 for rendering the focus image, the first optical combiner 306, the second optical combiner 308, and the lens 310 positioned on the optical path of projections of the rendered context and focus images. With reference to FIG. 5, the context image renderer 502 is smaller in size as compared to the context image renderer 302 of the display apparatus 300 of FIG. 3. Moreover, the display apparatus 500 also includes a magnifying optical element 504 positioned on the optical path of the projection of the rendered context image, between the context image renderer 502 and the first optical combiner 306. The magnifying optical element 504 potentially enables use of the physically small-sized context image renderer 502 as compared to the comparatively larger-sized context image renderer 302. For example, the magnifying optical element 504 may be a convex lens.

Figure 6:
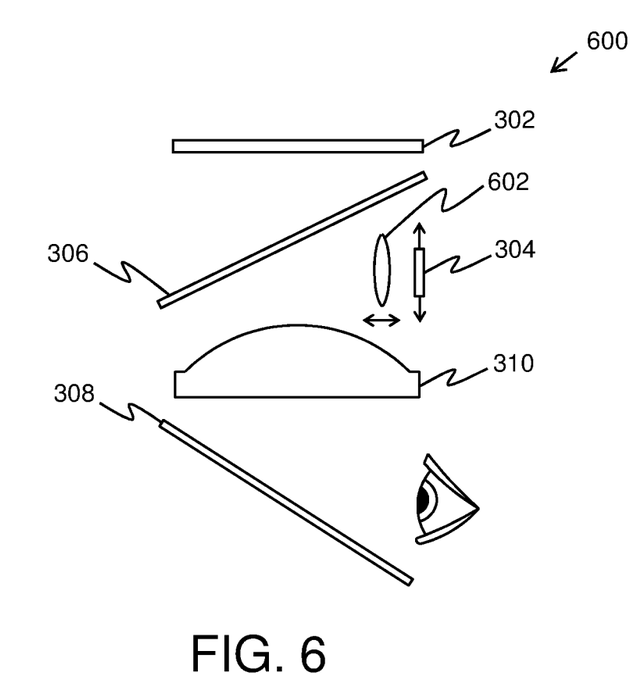

Referring to FIG. 6, there is illustrated an exemplary implementation of a display apparatus 600 (such as the display apparatus 300 of FIG. 3), in accordance with still another embodiment of the present disclosure. As shown, the display apparatus 600 includes the context image renderer 302 for rendering the context image, the focus image renderer 304 for rendering the focus image, the first optical combiner 306, the second optical combiner 308, and the lens 310 positioned on the optical path of projections of the rendered context and focus images. Moreover, the display apparatus 600 includes a varifocal element 602 for adjusting a focus of the projection of the rendered focus image. The varifocal element 602 is beneficially employed to achieve low vergence-accommodation conflict. In an example, the varifocal element 602 may be a convex lens positioned in front of the focus image renderer 304, wherein the varifocal element 602 may be moved by at least one actuator (not shown).

Figure 7:
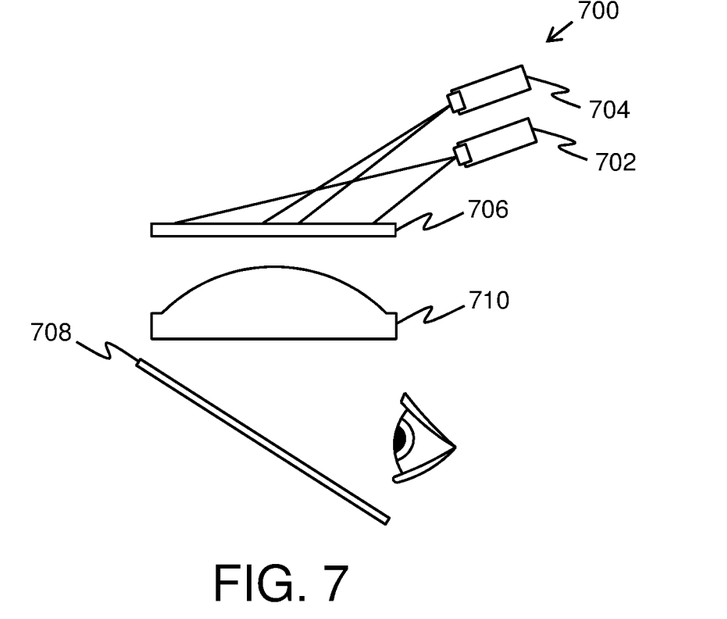

Referring to FIG. 7, there is illustrated an exemplary implementation of a display apparatus 700, in accordance with yet another embodiment of the present disclosure. As shown, the display apparatus 700 includes at least one context image renderer (depicted as a context image projector 702) for rendering the context image, at least one focus image renderer (depicted as a focus image projector 704) for rendering the focus image, at least one first optical combiner (depicted as a first optical combiner 706) for combining the projection of the rendered context image with the projection of the rendered focus image to form a combined projection, at least one second optical combiner (depicted as a second optical combiner 708) for combining the combined projection with a projection of a real world image, and a lens 710 positioned on the optical path of projections of the rendered context and focus images. In FIG. 7, the first optical combiner 706 is a projection screen that is configured to facilitate rendering of the context image and the focus image thereon.

Optionally, the display apparatus 700 further includes at least one third optical combiner (not shown in FIG. 7, for the sake of simplicity) for combining the projection of the rendered context image with the projection of the rendered focus image to form a preliminary combined projection. More optionally, the at least one third optical combiner is arranged to project the preliminary combined projection onto the first optical combiner 706. Optionally, in this regard, the at least one third optical combiner is positioned on an optical path between the image projectors (namely, the context and focus image projectors 702 and 704) and the first optical combiner 706.

Figure 8:
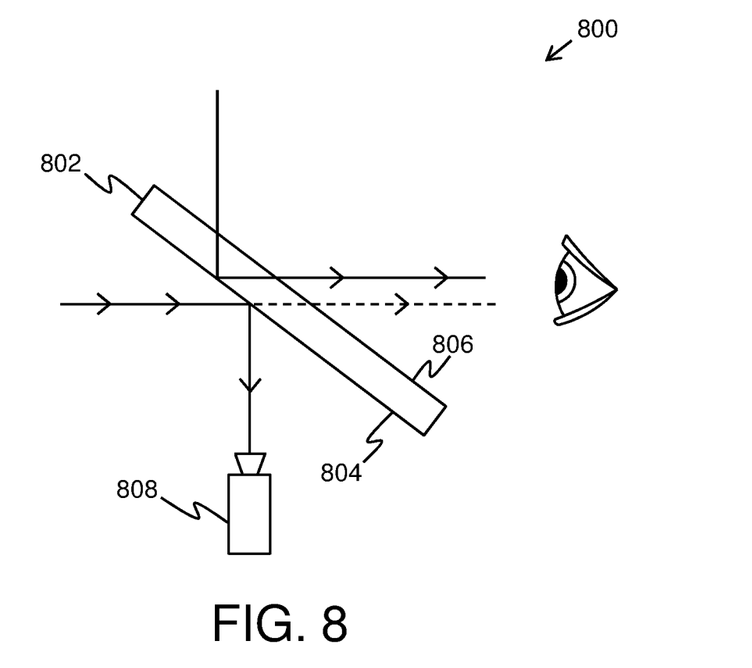
FIG. 8 is a ray diagram depicting an exemplary use case of the display apparatus, in accordance with an embodiment of the present disclosure.

Referring to FIG. 8, there is illustrated a ray diagram depicting an exemplary use case of a display apparatus 800 (such as the display apparatuses of FIGS. 1-7), in accordance with an embodiment of the present disclosure. Specifically, the display apparatus 800 includes at least one context image renderer (not shown), at least one focus image renderer (not shown), at least one first optical combiner (not shown), and at least one second optical combiner, depicted as a second optical combiner 802. The second optical combiner 802 has a first surface 804 facing the real world and a second surface 806 substantially opposite to the first surface 804. The first surface 804 is substantially reflective, while the second surface 806 is substantially anti-reflective. A first coating is employed to implement the substantially-reflective first surface 804, whereas a second coating is employed to implement the substantially anti-reflective second surface 806.

The display apparatus 800 further comprises at least one camera, depicted as a camera 808, positioned in a proximity of the first surface 804 of the second optical combiner 802 facing the real world. The camera 808 is arranged for capturing the projection of the real world image reflected towards the camera 808 from the first surface 804.

The second surface 806, being substantially anti-reflective, reduces unwanted reflection of a combined projection (from the at least one first optical combiner) towards eyes of the user, thereby preventing ghosting (namely, double image) of a virtual reality image. Furthermore, the anti-reflective second surface 806 also prevents ghosting of the real world image captured by the camera 808, and facilitates transmission of the projection of the real world image through the second optical combiner 802 towards the eyes of the user.

Figure 9:
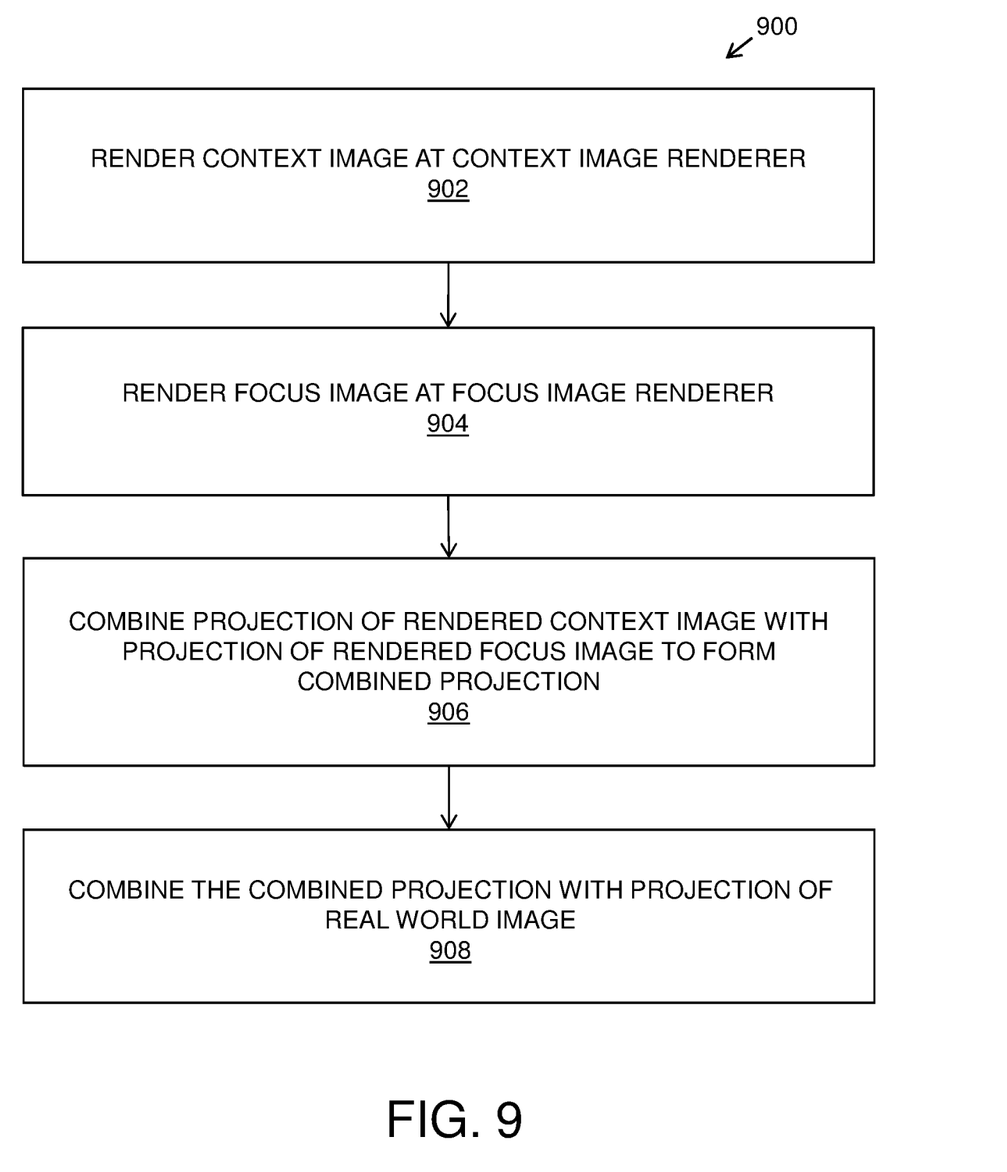
FIG. 9 illustrates steps of a method of displaying via the display apparatus, in accordance with an embodiment of the present disclosure.

Referring to FIG. 9, there are illustrated steps of a method 900 of displaying via the display apparatus (such as the display apparatus 100 of FIG. 1), in accordance with an embodiment of the present disclosure. At step 902, a context image is rendered at at least one context image renderer. An angular width of a projection of the rendered context image ranges from 40 degrees to 220 degrees. At step 904, a focus image is rendered at at least one focus image renderer. An angular width of a projection of the rendered focus image ranges from 5 degrees to 60 degrees. At step 906, the projection of the rendered context image is combined with the projection of the rendered focus image to form a combined projection, using at least one first optical combiner. At step 908, the combined projection is combined with a projection of a real world image, using at least one second optical combiner.

The steps 902 to 908 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

What is claimed is:

1. A display apparatus comprising:
   at least one context image renderer for rendering a context image, wherein an angular width of a projection of the rendered context image ranges from 40 degrees to 220 degrees;
   at least one focus image renderer for rendering a focus image, wherein an angular width of a projection of the rendered focus image ranges from 5 degrees to 60 degrees;
   at least one first optical combiner for combining the projection of the rendered context image with the projection of the rendered focus image to form a combined projection; and
   at least one second optical combiner for combining the combined projection with a projection of a real world image, wherein the at least one second optical combiner is switchable to different levels in transparency.

2. The display apparatus of claim 1, further comprising a varifocal element for adjusting a focus of the projection of the rendered focus image.

3. The display apparatus of claim 1, wherein the at least one second optical combiner has a first surface facing the real world and a second surface substantially opposite to the first surface, and wherein the first surface is substantially reflective, while the second surface is substantially anti-reflective.

4. The display apparatus of claim 1, wherein the at least one second optical combiner is curved in shape.

5. The display apparatus of claim 1, wherein the at least one context image renderer and/or the at least one focus image renderer are implemented by way of at least one projector and at least one projection screen, wherein the at least one projection screen is curved in shape.

6. The display apparatus of claim 1, further comprising:
   means for detecting a gaze direction; and
   a processor coupled in communication with the at least one first optical combiner, the at least one second optical combiner and the means for detecting the gaze direction, wherein the processor is configured to:
   (a) obtain an input image, and use the detected gaze direction to determine a region of visual accuracy of the input image;
   (b) process the input image to generate the context image and the focus image, the context image having a first resolution and the focus image having a second resolution, wherein:
      (i) a region of the context image that substantially corresponds to the region of visual accuracy of the input image is masked,
      (ii) the focus image substantially corresponds to the region of visual accuracy of the input image, and
      (iii) the second resolution is higher than the first resolution; and
   (c) render the context image at the at least one context image renderer and the focus image at the at least one focus image renderer substantially simultaneously, whilst controlling the at least one first optical combiner to combine the projection of the rendered context image with the projection of the rendered focus image in a manner that the projection of the rendered focus image substantially overlaps the projection of the masked region of the rendered context image.

7. The display apparatus of claim 6, further comprising at least one camera coupled in communication with the processor, wherein the at least one camera is positioned in a proximity of a first surface of the at least one second optical combiner facing the real world, and is arranged for capturing the projection of the real world image reflected towards the at least one camera from the first surface.

8. The display apparatus of claim 7, wherein the processor is operable to combine the at least one image of the real world with the combined projection to reduce vergence-accommodation conflict.

9. A display apparatus comprising:
- at least one context image renderer for rendering a context image, wherein an angular width of a projection of the rendered context image ranges from 40 degrees to 220 degrees;
- at least one focus image renderer for rendering a focus image, wherein an angular width of a projection of the rendered focus image ranges from 5 degrees to 60 degrees;
- at least one first optical combiner for combining the projection of the rendered context image with the projection of the rendered focus image to form a combined projection; and
- at least one second optical combiner for combining the combined projection with a projection of a real world image;
- means for detecting a gaze direction; and
- a processor coupled in communication with the at least one first optical combiner, the at least one second optical combiner and the means for detecting the gaze direction, wherein the processor is configured to:
  - (a) obtain an input image, and use the detected gaze direction to determine a region of visual accuracy of the input image;
  - (b) process the input image to generate the context image and the focus image, the context image having a first resolution and the focus image having a second resolution, wherein:
    - (i) a region of the context image that substantially corresponds to the region of visual accuracy of the input image is masked,
    - (ii) the focus image substantially corresponds to the region of visual accuracy of the input image, and
    - (iii) the second resolution is higher than the first resolution; and
  - (c) render the context image at the at least one context image renderer and the focus image at the at least one focus image renderer substantially simultaneously, whilst controlling the at least one first optical combiner to combine the projection of the rendered context image with the projection of the rendered focus image in a manner that the projection of the rendered focus image substantially overlaps the projection of the masked region of the rendered context image.

* * * * *